(12) United States Patent
Patton et al.

(10) Patent No.: US 8,341,223 B1
(45) Date of Patent: Dec. 25, 2012

(54) METHOD FOR RELEVANT CONTENT DISCOVERY

(75) Inventors: Damien Patton, Palo Alto, CA (US); Yann Landrin-Schweitzer, San Jose, CA (US)

(73) Assignee: Banjo, Inc., Palo Alto, CA (US)

( * ) Notice: Subject to any disclaimer, the term of this patent is extended or adjusted under 35 U.S.C. 154(b) by 0 days.

(21) Appl. No.: 13/491,363

(22) Filed: Jun. 7, 2012

Related U.S. Application Data

(60) Provisional application No. 61/494,343, filed on Jun. 7, 2011, provisional application No. 61/539,359, filed on Sep. 26, 2011, provisional application No. 61/620,603, filed on Apr. 5, 2012.

(51) Int. Cl.
*G06F 15/16* (2006.01)

(52) U.S. Cl. ........ 709/204; 709/202; 709/205; 709/206; 455/456.1; 455/416

(58) Field of Classification Search .................... 709/204
See application file for complete search history.

(56) References Cited

U.S. PATENT DOCUMENTS

| | | | |
|---|---|---|---|
| 6,542,749 B2 * | 4/2003 | Tanaka et al. .............. 455/456.1 |
| 6,542,750 B2 * | 4/2003 | Hendrey et al. ............ 455/456.1 |
| 6,618,593 B1 | 9/2003 | Drutman et al. |
| 6,944,443 B2 | 9/2005 | Bates et al. |
| 7,844,254 B2 | 11/2010 | Arnold et al. |
| 7,849,204 B2 | 12/2010 | Yared et al. |
| 7,917,154 B2 | 3/2011 | Fortescue et al. |
| 7,996,464 B1 | 8/2011 | Wang et al. |
| 8,155,669 B2 | 4/2012 | Ziskind et al. |
| 8,165,604 B2 | 4/2012 | Ziskind et al. |
| 2002/0090954 A1 * | 7/2002 | Tanaka et al. ................. 455/456 |
| 2002/0107008 A1 * | 8/2002 | Hendrey et al. .............. 455/416 |
| 2006/0224587 A1 * | 10/2006 | Zamir et al. ...................... 707/7 |
| 2008/0114847 A1 * | 5/2008 | Ma et al. ...................... 709/206 |
| 2011/0238759 A1 * | 9/2011 | Spataro et al. ................ 709/205 |
| 2012/0011189 A1 * | 1/2012 | Werner et al. ................. 709/202 |

\* cited by examiner

*Primary Examiner* — Hua Fan
(74) *Attorney, Agent, or Firm* — Jeffrey Schox; Diana Lin

(57) ABSTRACT

A method including: retrieving information, associated with an account identifier, from a social network; generating a user profile from the retrieved information, wherein the user profile includes user interests; retrieving content from the social network; extracting content parameters from each piece of retrieved content, the content parameters including a content location and a content time; evaluating relevance of the content by a degree of similarity between the user profile and the content; in response to receiving a device location and a filtering time, filtering the content by the device location and the filtering time; and sending the filtered content to a user device.

22 Claims, 6 Drawing Sheets

METHOD FOR RELEVANT CONTENT DISCOVERY

CROSS-REFERENCE TO RELATED APPLICATIONS

This application claims the benefit of U.S. Provisional Application No. 61/494,343, filed 7 Jun. 2011, U.S. Provisional Application No. 61/539,359, filed 26 Sep. 2011, and U.S. Provisional Application No. 61/620,603, filed 5 Apr. 2012, which are incorporated in their entirety by this reference.

TECHNICAL FIELD

This invention relates generally to the social media content field, and more specifically to a new and useful method for delivering location relevant content in the social media field.

BACKGROUND

Social networks have given people new ways of connecting with others. Typically, people use social networks to connect to others by messaging and sharing content through the social networks. Furthermore, in recent years, mobile phones have enabled social networks to branch out and associate a geographic location with social network messages and content. Despite these new forms of interactions that enable users to connect with others, and even to do so while being mobile, there is still a large barrier to connecting with those physically near by. Users are scattered between numerous social networks, and the number of users creating content can saturate users with information. This oversaturation can lead to users overlooking relevant information that could potentially be interesting to them, such as when a social connection is nearby or when relevant content is generated nearby. Thus, there is a need in the social media content field to create a new and useful method for delivering location relevant content. This invention provides such a new and useful method.

DESCRIPTION OF THE PREFERRED VARIATIONS

The following description of the preferred variations of the invention is not intended to limit the invention to these preferred variations, but rather to enable any person skilled in the art to make and use this invention.

Figure 1:
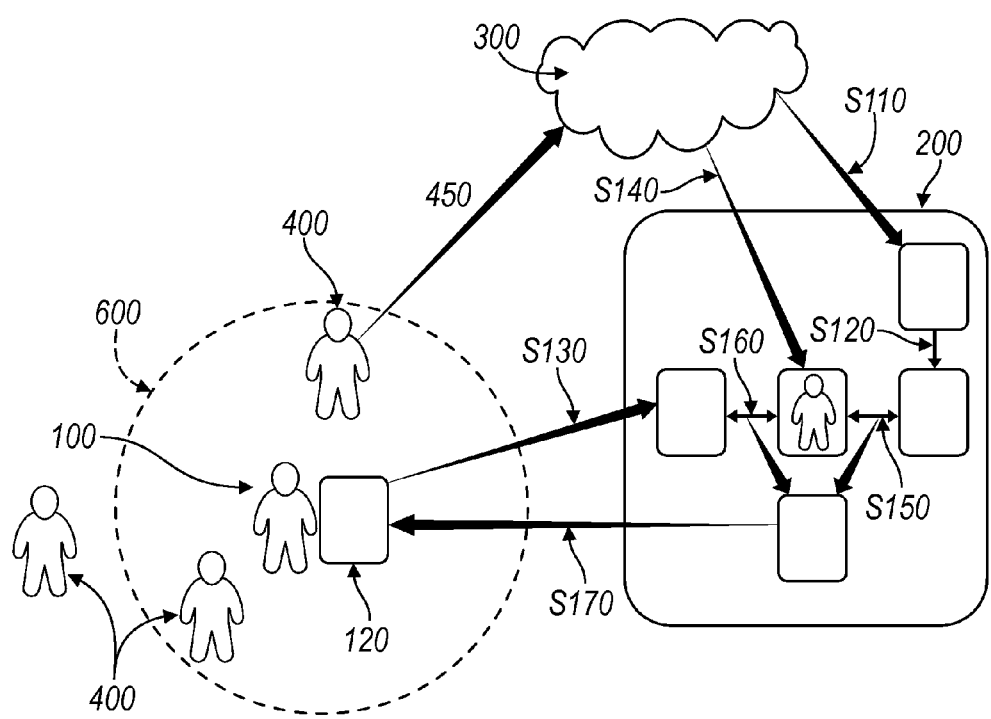
FIG. 1 is a schematic representation of a method for delivering relevant content.
Figure 2:
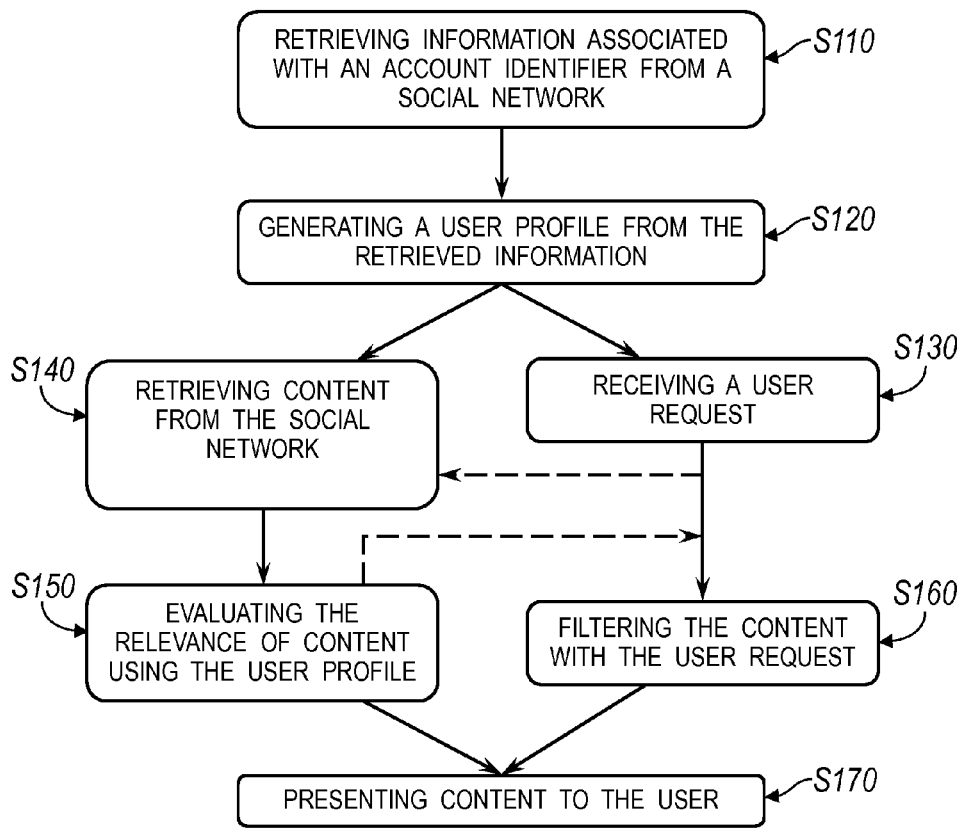
FIG. 2 is a block representation of a method for delivering relevant content.

As shown in FIGS. 1 and 2, a method for delivering relevant content of a preferred variation includes retrieving information associated with an account identifier from a social network Block S110; generating a user profile from the retrieved information Block S120; receiving a user request Block S130; retrieving content from the social network Block S140; evaluating relevance of the retrieved content using the user profile Block S150; filtering the content with the user request Block S160; and presenting relevant content to the user Block S170. This method functions to connect users 100 to other users 400 around them, and can additionally aid in discovery of content 450 relevant to the user. In one variation, the method functions to identify people 400 located near the user 100 by identifying authors of content 450 generated near the user's location, wherein the content is content generated through a social network platform 300. This can be particularly useful if the other users 400 are not continuously or periodically broadcasting their locations. In another variation, the method functions to identify content 450 generated near the user (e.g. within a location region 600) by identifying location-associated content. The method is preferably implemented through an application on a user device 120 and a communication connection to at least one social network. The user device may be any suitable device such as a phone, tablet computer, personal computer, gaming device, or any suitable user device. The user device is preferably mobile, but may alternatively be substantially stationary. The method can additionally include an external computing device 200, such as a server or a second user device, that communicates with the application on the first user device. The method can alternatively be implemented by any suitable computing device.

Retrieving information associated with an account identifier from a social network Block S110 functions to obtain user information for determining content relevance. More specifically, the retrieved information is preferably used to generate a user profile, which is used to determine content relevance. Retrieving information preferably includes receiving account parameters and retrieving information from the social network. Account parameters for one or more social networks can be received, and user information from one or more social networks can be retrieved.

Retrieving information associated with an account identifier S110 preferably includes receiving user account parameters. The account parameters preferably include at least one user account identifier or name associated with a social network, and can additionally include user account authentication, such as a password or account authorization for the respective user account. The user account parameters are preferably used to identify the user account from which to draw the user parameters. The user account parameters (e.g. the user account name) can additionally be used to index and retrieve stored data associated with the user (e.g. from a database that stores the user profile). The account parameters are preferably provided by the user, but can alternatively be provided by the device, wherein the device preferably retrieves user account parameters stored within the device. The user account parameters are preferably obtained a single time and stored by a native application on the user-associated user device. Alternatively, the user account parameters can be stored on an external server. The user account parameters can alternatively be obtained each time a search is initialized, periodically obtained, obtained each time the native application is launched, or obtained in response to any suitable authorization condition being met.

Retrieving information S110 preferably further includes retrieving information from the social network. Information is preferably retrieved by the user device or server in response to the receipt of an account parameter, and can additionally or alternatively be retrieved periodically, in response to a notification from the social network, each time the user accesses the native application, or in response to any other suitable information retrieval condition being met. Alternatively, information can be received from the social network (e.g. wherein the social network pushes the information to the server or user device).

Public information associated with the account identifier is preferably retrieved, but private information associated with the account identifier can additionally be retrieved, particularly when account authentication is provided. Information that is retrieved can include a social network profile associated with the account identifier; a content stream associated with the account identifier that can include user-generated and/or connection-generated posts; social network connections of the account identifier; and/or any other suitable information associated with the account identifier.

Furthermore, information associated with the social network connections are preferably additionally retrieved. The retrieved information associated with the social network connections preferably includes public information (e.g. unprotected information) associated with each social network connection. The retrieved information associated with the social network connections can also include protected information, such as information to which access is allowed through the provided account authorization. The retrieved information preferably includes a connection account profile associated with the account identifier, but can additionally include social network connections of the connection, a content stream associated with the connection, or any other suitable information associated with the connection.

Generating a user profile from the retrieved information Block S120 can function to generate a user profile that can be used to determine content relevance. The user profile is preferably stored in a database within an external server or computing device, but can alternatively be stored on the user device. The user profile can be identified within the database by the account identifier, by a unique identifier associated with the user of the user device (e.g. a phone number, etc.), or by any other suitable identifier. The user profile preferably includes user interests, social network connections, and user settings, but can additionally include user history or any other suitable data indicative of user interests. The user profile is preferably updated each time content is retrieved from a social network, but can additionally be updated each time a user action is received (e.g. when the user location changes, when the user settings change, when a query is received, etc.), or in response to any suitable updating condition being met. Generating a user profile Block S120 can include extracting user interests from the retrieved information, retrieving the social network connections of the account identifier, and/or storing user settings, but can additionally include any other suitable actions for generating a user profile.

Generating a user profile Block S120 can include extracting user interests from the retrieved information, which functions to determine subject matter that can be of interest to the user. User interests are preferably derived from the retrieved information associated with the one or more account identifiers provided for one or more social networks in association with the user, but can also be derived from information received from the user. User interests are preferably derived from public information associated with the account identifiers, but can additionally be derived from protected or private information associated with the account identifiers, particularly when authorization for the respective account is received. User interests are preferably derived from keywords, images, videos, or any other suitable form of media found in the profile, location, profile picture, posts, social network contacts, stated user interests, the account associated content feed, or any other suitable public information associated with the account. User interests preferably include positive interests, or subject matter in which the user is interested in, and can additionally include negative interests, or subject matter in which the user is specifically not interested (e.g. interest exclusions). As another variation, user interests may include either explicit interests or alternatively implicit interests.

User interests preferably include explicit interests, which are preferably directly extracted from the retrieved information. Explicit interests preferably include interests that are explicitly identified as interests in the retrieved information. Explicit interests can be extracted from account profile information associated with the account identifier, wherein the account profile includes keywords, categories, and/or pages explicitly tagged as interests (e.g. an "interested in" section that lists user interests in bands, music genres, food categories, sport teams, activities, etc.). Explicit interests can also be extracted from content with which the user account has associated a positive indicator (e.g. the user has tagged the content with a "Like" or "+1"). However, explicit interests can be extracted from any other suitable explicit indicator of user interest. Explicit interests can additionally include negative interests, wherein the subject matter has explicitly been tagged with a negative indicator (e.g. a downvote).

User interests can additionally include implicit interests, which include interests that are not explicitly identified as interests in the retrieved information. Implicit interests are assumed interests based on processing retrieved information. Implicit interests are preferably obtained by scraping, running learning algorithms, or otherwise processing the retrieved information. Implicit interests can be indicated by subject matter frequency, key phrases (e.g. "I like" or "I hate", as determined by natural language processing), or any other suitable implicit interest indicator. For example, a connection can be deemed highly relevant if the user frequently interacts with the connection (e.g. as determined from historical account information associated with the account identifier). In another example, if multiple posts referencing the user account include "San Francisco"-related location tags, then "San Francisco" is preferably included in the user interests. Furthermore, the interests of the user's social network connections can additionally influence the derived user interests.

Generating a user profile from the retrieved information Block S120 can additionally or alternatively include retrieving the social network connections of a user. More specifically, generating a user profile preferably includes retrieving the social network connections of an account associated with the received account identifier. Retrieving social contacts of a user can include requesting the social connections associated with the account identifier from the associated social network, accessing the social network using the account authentication and scraping the connection information, or otherwise processing the user account to retrieve the social contact information associated with the user account. Furthermore, indirect contacts can additionally be retrieved. This is preferably performed by analyzing contacts of a contact of a user. For example, a friend of a friend of a user is preferably identified as a second degree contact. Any suitable level of indirect contact can be obtained (e.g., second degree contact, third degree contact, etc.). Preferably, a user is able to see the closeness of any social network connection (e.g., degrees of separation) and can additionally see who or how the user is connected to another user.

Retrieving the social network connections of the user can additionally include generating a connection profile for each social network connection from the retrieved information associated with the social network connection. The connection profiles are preferably generated in a similar manner as the user profile generation.

Generating a user profile Block S120 can additionally or alternatively include storing user settings. User settings are preferably predetermined user settings, but can additionally or alternatively be received from the user device, wherein the received settings preferably override the predetermined default settings. The user settings preferably include location region settings, time settings, connection settings, media settings, content aspect settings, content/connection volume settings, or any other suitable setting to control what type of content is displayed to the user. The settings preferably define thresholds, but can alternatively define ranges, selections, conditions, or any other suitable setting. Location region settings are preferably used to filter the content by location. Location region settings can include a radius threshold (e.g. 1 ml radius about the user location), a political/geographical granularity selection (e.g. district vs. city), a location selection (e.g. "San Francisco," "home"), or any other suitable location region setting. Time settings are preferably used to filter the content by content time. Time settings can include a time duration (e.g. display content generated within the last 2 hours), a time period (e.g. display content generated from 4 pm to 6 pm, yesterday), or any other suitable time setting. Connection settings are preferably used to filter the content by the connection associated with the content and/or social network platform associated with the content. Connection settings can include a connection exclusion, wherein content generated by the excluded connection is not sent to the device or displayed to the user; a connection inclusion, wherein content generated by the included connection is sent to the device; social network exclusion or inclusion, wherein content generated within the excluded or included social network is excluded or included in the content sent to the device, respectively; or any other suitable connection setting. Media settings are preferably used to filter the content by content media type. Media settings can include selection for inclusion and/or exclusion of text posts, images, video, audio, or any other suitable media type. Content aspect settings are preferably used to determine which content parameter is displayed to the user. For example, the content aspect settings can allow connection notifications to be displayed, but not content notifications. Furthermore, content aspect settings can include display selections, which preferably control how different content parameters are displayed to the user. For example, the display selection can include an alert for a connection but a list display for content. Content/connection volume settings are preferably used to set a goal or limit for the number of displayed content and/or connections. However, any other suitable settings can be stored.

Receiving a user request Block S130 preferably functions to receive transient parameters with which the content is filtered. The user request preferably includes a user location and a request time, wherein receiving a user request preferably includes receiving the user location and determining the request time. The user request can additionally include a query parameter, wherein receiving a user request can additionally include receiving a query parameter. The user request is preferably explicitly specified by the user before being sent by the user's device to the server, but can alternatively be automatically determined by a native application on the device, or by an algorithm or set of rules on the sever.

Receiving a user request S130 preferably includes receiving a user location, which functions to determine a geographic location with which to filter content. The user location is preferably the geographic location of the user. More preferably, the user location is the device location, whether the substantially instantaneous device location or the most recent saved device location. The device location is preferably obtained through a location service of the device, such as by using the GPS of the user device, using cell phone tower triangulation, near-field identification, IP location lookup, (e.g. identification of a location using Bluetooth, QR code scanning, etc), or any other suitable geolocation method. Alternatively, the location can be a saved location, a location input, a location derived from the locations of events pertaining to the interests of the user. For example, a user can be able to save the location of a favorite location. The user location is preferably periodically obtained at a predetermined interval, but can be obtained in response to a user action (e.g. when the user accesses the native application, etc.), obtained in response to a social network action (e.g. when a first degree connection generates content that reveals a location), or obtained at any suitable time.

The user location is preferably used to establish a location region that is used to filter the content. The location region is preferably associated with the user location, wherein the location region preferably encompasses the user location. Alternatively, the location region can be unassociated with the user location, such as when a location query is used. The location region is preferably an area defined by a distance from a geographic location (e.g. the user location), but can alternatively be a politically or culturally defined area (e.g., a city, district, location moniker specific to a subculture), a location region associated with the user through historical user actions (e.g. "home," "work," etc.), an area defined by an action-defined distance from a geographic location (e.g. within walking distance, biking distance, etc.) a geometrically defined area, a location query, a plurality of regions, or any suitable defined region. The location region is preferably defined by a default setting, but can alternatively be defined by the location region parameter/section of the user settings.

In one variation of the method, the location region can be adjusted to achieve a desired number of nearby users, wherein nearby users are the authors of the location-associated content. The users are preferably unique; for example, if multiple pieces of content are generated by a single user, only one user is preferably identified. Additionally, content generated by a single user across multiple social network platforms are preferably associated with only one user, wherein the multiple social network accounts associated with said user are preferably consolidated into a single user identifier. The location region is preferably increased to find more proximal users, and decreased to find less proximal users. The location region can be adjusted by adjusting the search distance away from the user location (e.g. searching within a 2 block radius instead of a 1 mile radius), by adjusting the level of predefined region categorization (e.g. searching within a city instead of searching within a district), or adjusting any other suitable location region parameter. The location region is preferably incrementally expanded and/or contracted until the desired numbers of users are found. For example, if 20 users are desired and there are not 20 users within 400 meters of the current user, then the location region is expanded to a radius of 800 meters, wherein the location region is continually expanded until 20 users are found.

In another variation of the method, the location region is adjusted to reach a desired volume of content. For example, the radius of a circle defining a location region can continue to expand until a certain number of posts or status updates is reached. For example, to obtain the first 20 posts from a social network, a location region with a distance of at most 100 meters from the user location is used. To obtain the next 20 posts, a location region with a distance of at most 500 meters from the user location is used.

The desired volume of retrieved data is preferably preset so as to ensure that the application presents an adequate number of contextual results to be useful to the current user. However, the desired volume of retrieved data (connections and/or content) can be defined by a user-defined content and/or connection volume setting.

Receiving a user request S130 preferably additionally includes determining a request time, which functions to determine a time with which to filter content. The request time can be determined by the user device and received by the server (e.g. as a user request-associated timestamp), or can be determined by the server. The request time is preferably the time at which the user request is generated, as determined by the user device, but can alternatively be the time at which the user request is sent, or the time at which the user request is received. The time is preferably a timestamp associated with the user request, but can alternatively be any other suitable time indicator. The time is preferably received concurrently with the user location, but can alternatively be received before or determined after.

Receiving a user request S130 can additionally include receiving query parameters. The query parameters preferably function as additional inputs to the filtering of retrieved content. The query parameters are preferably received by the user device from the user, and are preferably sent by the user device and received by the server. The query parameters are preferably sent with an associated user location (device location) and request time, wherein the request time is preferably the time of query receipt from the user. Additionally or alternatively, query parameters can be processed and stored within the user profile as a user interest. A query parameter can include a time input, a text input, a location selection, a media input, or any other suitable query parameter. A query parameter preferably limits any displayed content to items that satisfy or match the query, but can alternatively be used directly in computing how relevant the content is. The time input can limit the retrieved content to content generated within the input time period. The time input can include a selection from a list, the receipt of a time entry, or any other suitable time input. The text input can include a search string, a category keyword, a location name (e.g. a symbolic location input), or any suitable text input. The text input can additionally be processed to abstract the received text, preferably by using a hierarchical language/meaning tree, but alternatively by using any other suitable natural language processing technique. For example, "Baseball" can be abstracted to "Sports." The location selection can include a selection from a list (e.g. one presented by the native application on the user's user device), a selection of a pre-defined area on a map (e.g. a politically bounded area, a geographically bounded area, a culturally bounded area, etc.), a selection of a user-drawn area on a map, a selection of a distance, or any other suitable location selection. The media input preferably includes audio input, image input, and/or video input. The media input is preferably device-generated (e.g. a photo taken by the device), but can alternatively be media from an external source (e.g. a video found on the Internet). The media input is preferably processed to extract the query parameter. In one variation of the method, the title of the media input is extracted as the query parameter. In another variation of the method, facial image recognition and/or voice recognition is performed on the media to generate a person identity from the media. This can be used in processing content to identify content from people matching or likely matching that person identity. For example, a user can take a photo of a person in a location. A person identity (e.g., an encoding that represents the facial patterns of the person) is used in combination with the user location to identify content associated with the person. In this variation, person identities are preferably initially associated with social media accounts. A data structure is created that stores this association. Preferably, the author or entity responsible for the social media content is identified through media associated with an account. For example, the profile picture of a user is used to create the primary person identity associated with the account. Additionally or alternatively, person identities can be matched to user accounts that include public content, such as media references, of a person identity. For example, a sports-focused news account can include numerous photos of professional athletes. After processing media posted from the sports-focused news account and identifying several person identities that correspond to popular athletes, the person identities of the athletes can be associated with the sports-focused news account (e.g. added as an attribute of that account). The person identity is then matched against person identities associated with connections associated with retrieved content. The retrieved content will preferably be content generated by or associated with the matched connection. For example, taking a photo of a user will preferably return content posted by that user on a social network. Alternatively, taking a photo of a popular athlete can return content about that celebrity.

Retrieving content from the social network, Block S140, functions to gather content that is potentially relevant to the user. Retrieved content preferably includes content generated by the social network connections of the account identifier, but can include any suitable content from the social network. Content can be retrieved in response to a receipt of a user request, retrieved in response to a notification from the social network (e.g. of new content), or in response to any other suitable retrieval condition. The content is preferably retrieved by the external server, but can alternatively be retrieved by the user device.

In one variation of the method, the retrieved content is preferably time-dependent, wherein recently generated content is preferably retrieved, and older content is preferably not retrieved. Recently generated content preferably includes content that was generated within a predetermined time period from the time of content retrieval. For example, content generated within the past five hours of the content retrieval time is preferably retrieved, while content generated beyond the five-hour limit is preferably not retrieved. However, content generated during any suitable time period can be retrieved. Alternatively or additionally, the external server and/or user device can delete any stored content older than a given time threshold.

In another variation of the method, retrieved content is limited to content associated with a location region. Content is preferably associated with the location region if the content was generated within the location region (e.g. as indicated by a geotag). However, content can also be associated with the location region if the content mentions or references a location region, or mentions or references a place identifier (e.g. the name of a restaurant) located within and/or associated with the location region. The content can be otherwise associated with the location region.

The content is preferably retrieved from one or more social networks, wherein the one or more social networks preferably includes, but are not limited to, the social network with which the received user account parameter is associated. For example, even though the user only provides a Facebook account identifier, location-associated content from other social networks, such as Twitter, Foursquare, or Yelp can be retrieved. The set of social networks from which content is retrieved is preferably predetermined, but can alternatively be determined and/or selected by the user.

In a first variation of the method, the one or more social networks are queried with a location associated with the location region (e.g. through a social network API), wherein content associated with the location is received. This variation can additionally include querying the social network with the received query, such that the received content is related to both the location region and the query. This variation can be performed in response to a user action (e.g. accessing the native application on the user device, selection of a "search" or "refresh" icon, receipt of a query, etc.).

In another variation of the method, social network content for a plurality of locations can be initially acquired and then formatted for fast querying and processing with the user request and/or user profile. In this variation, content of the social network is preferably acquired for a plurality of select locations, such as popular locations (e.g. locations with a high volumes or relative densities of content generation), locations of high interest to the user (e.g. locations with high volumes of content generation by the user or the user's connections, locations that the user typically generates content from, locations that the user generates content around, etc.), or any suitable given location. The content is preferably then organized or processed such that user location and/or user parameters can be used to select a portion of the content.

In another variation of the method, all social network content is retrieved and formatted for querying and processing with the user request and/or user profile. Alternatively, social network content associated with the account identifier can be retrieved and formatted. Alternatively, social network content associated with the account identifier and the social network connections of the account identifier can be retrieved and formatted.

In another variation of the method, newly generated social network content is retrieved and formatted for querying and processing with the user request and/or user profile in response to a notification from the social network. This variation can additionally include setting social network API settings to notify the server and/or user device of newly generated content. However, any suitable method of retrieving location-associated content can be used.

In another variation of the method, multiple social network queries with tiered query parameters based on the user request can be used. For example, the first tier searches the location region for any content generated by social network connections with a connection to the user. A second tier searches the location region for content from users with a similar connection profile. A third tier searches for any content in the location region. A fourth tier can search for any content associated with the location based on time. Alternatively, the content of a location can be gathered and processed in isolation to determine relevance.

Evaluating relevance of the retrieved content, Block S150, functions to organize and/or score the retrieved content. Evaluating relevance of content with the user parameters preferably includes extracting content parameters and defining a measure of content relevance. Additionally, evaluating relevance may include organizing the content according to the content relevance. The content is preferably organized after the content's relevance is determined, but content organization can be performed during content relevance definition. Furthermore, the content is preferably processed after content retrieval S140, but can alternatively be processed during content retrieval.

Extracting content parameters from the retrieved content functions to determine the values of the factors of interest. Content parameters that are extracted can include the location associated with the content; an account associated with the content; a time associated with the content; any keywords or media (images, audio clips, video) associated with the content; or any other suitable content parameter. The location associated with the content can include the tagged location of the content, a location referenced in the content, a location extrapolated from the content (e.g. "Bay Area" can be extracted from a mention of "Philz"), or any other suitable location. The account associated with the content can include the account of the content author, an account referenced within the content, or any other suitable account. The time associated with the content can be the time of content creation, the time of content posting to the respective social network, a time extrapolated from the content (e.g. "December" can be extrapolated from a mention of "Christmas"), or any other suitable time associated with the content.

Defining content relevance functions to determine relevance between the content and the user interests. Content relevance is preferably determined when the content is retrieved. A relevance score, a relevance threshold, relevance criteria, or any suitable manner of comparing the relevance of content can be used. Alternatively, the relevance of content may be pre-determined, or obtained as the output of an algorithm, either statically or dynamically adjusted according to user activity and/or as part of the user profile (e.g. produced by the selection of a set of rules by the user or as the effect of a learning algorithm). Determining content relevance can include ranking, sorting, rating, filtering, scoring, or any other suitable manner of determining the relevance of one piece of content relative to another. In one variation, defining content relevance includes assigning weights to each piece of content, wherein content is then sorted according to the assigned weights. The assigned weights can be additive for each factor, or can be adjusted when considering each factor. A high score, weight, or ranking is preferably indicative of highly relevant content, while a low score, weight, or ranking is indicative of less relevant content. Content relevance can be determined across multiple factors, wherein the multiple factors can impact the ordering or filtering of content. More preferably, content relevance is preferably determined for persistent or semi-persistent factors (e.g. user profile), wherein the persistent and/or semi-persistent factors are preferably not transient factors, such as user location or time. A shared social network connection can be a relevance factor. For example, content is preferably considered more relevant (e.g. assigned a higher weight) if the connection associated with the content (e.g. author or mentioned connection) has a direct or indirect social network connection to the user. The degree of connection separation between the user and the content-associated connection can be another relevance factor. The degree of separation is preferably proportional to the relevance, wherein content generated by closer connections are preferably more relevant than content generated by further connections. Level of shared interests between the user profile and the connection profile can be another factor. The similarity in interests can be proportional to the relevance of content. For example, content can have higher relevance if the content is generated by a connection account including shared demographics or interests with the stored user profile of the primary user. The geographical distance between the user and the content can be another factor. The degree of interest in the connection can be another relevance factor. For example, content can be considered more relevant if the user is highly interested in the connection associated with the content. The popularity of the content author (e.g., number of followers) can be another factor. This factor is an example of a factor that is independent of the relationship of the author of content and the primary user. The popularity of the content author is preferably proportional to the relevance. For example, content posted by a famous athlete is preferably more relevant than a user with few followers. The rarity of the content parameter combination for the given piece of content can be another factor. For example, content generated in San Francisco by a connection that typically generates content in Berlin is preferably more relevant than content generated in San Francisco by a connection that typically generates content within San Francisco. However, any other suitable factor can be used to determine relevance. Weighting of content along these factors can be used to determine an overall relevance. Furthermore, different factors can confer higher relative weights than others. For example, the degree of connection separation can confer more weight than the level of shared interests.

In another variation of the method, defining content relevance includes categorizing the content by types of relevance. Content is preferably categorized as a given category and/or group when the content surpasses or satisfies a categorization condition. Content can be organized into a contact group, wherein the categorization condition is preferably a connection separation threshold, such that the contact group includes content generated by authors with a direct or indirect social network connection to the user. Content can alternatively be organized into an interest group, wherein the categorization condition is preferably a popularity threshold or degree of interest threshold, such that the interest group includes content generated by popular users or authors with interests similar to those of the user. Content can alternatively be organized as an around me group, wherein the categorization condition preferably includes a location proximity threshold and a time proximity threshold, such that the around me group includes the most recently generated content by authors that do not fit in the other groups. Content can alternatively be organized into a notification group (e.g. an alert group), wherein the categorization condition can include a rarity condition, such as the combination of content parameters having a historical occurrence rate of below a rarity threshold, or any suitable combination of parameter thresholds. For example, content can be categorized into the notification group if the content satisfies a set of parameter conditions, including the associated connection being within a connection degree threshold, the content time being within a time threshold, the content location being within a location region, and the content generation frequency of the associated connection being within a frequency threshold.

Filtering the content functions to filter the content with the user request. More preferably, filtering the content includes filtering the content with the user location and the request time. However, filtering the content can additionally include filtering the content with the query parameter. Content is preferably filtered after or concurrently with content retrieval, but can alternatively be filtered at any suitable time. Content is preferably filtered before the content is evaluated for relevance, but can alternatively be filtered during or before evaluating content relevance. Content is preferably filtered in response to receipt of a user request, wherein the user location and request time is preferably used to filter the content. Filtering the content preferably includes adjusting a relevance score assigned to each item of content, and then selecting the items according to relative scores. Selection of items may be based on the score of an item satisfying a certain threshold, having the highest scores up to a certain number, matching a certain criteria, by removing results that match another criteria or by any suitable selection technique. Alternatively, filtering the content can include sorting the weighted content by time or distance or any suitable method of filtering the content may be used. Alternatively, filtering the content can include sorting the weighted content by relevance to the query parameters. Alternatively, filtering the content can include selecting content that satisfies the user settings. However, any other suitable method of filtering the content can be used.

In one variation of the method, filtering the content includes adjusting the relevance scores of the content based on the distance and/or time. The distance between the content location of a piece of content and the user location is preferably indirectly proportional to the relevance score (e.g. content from a closer location—more proximal to the primary user—is more relevant). Additionally, the duration of time between the content time and the request time is preferably indirectly proportional to the relevance score, wherein newer content is preferably scored as more relevant than older content.

In another variation of the method, the content is filtered by distance between the user location and the content location, wherein content satisfying a location threshold are preferably selected for display. In yet another variation of the method, the content is filtered by the duration of time between the request time and the content time, wherein content satisfying a time threshold are preferably selected for display.

In another variation of the method, the content is filtered according to its relationship with the query parameters, such as a search term or media type. The relevance between the query parameter and the content is preferably directly proportional to the relevance score adjustment, wherein the more similar content is preferably scored as more relevant than less similar content. Alternatively, content having high relevance with the query parameters can be selected for display.

In another variation of the method, content is filtered by selecting content that satisfies the user settings. Selecting content that satisfies the user settings can include selecting content located within the location region defined by the location region setting (e.g. location threshold); selecting content generated within the time period defined by the time setting (e.g. within a time threshold measured from the receipt time, within a user defined time period); selecting content that satisfies the connection settings (e.g. excluding content from connections that are blocked by the user, including content from connections that the user explicitly wants to see content from); and/or selecting content that satisfies the query parameters (e.g. content that matches or is related to the query parameters). However, any other suitable user setting can be used to select content.

Presenting relevant content to the user, Block S170, functions to create a representation of the content to deliver to the user. The content is preferably displayed by a native application on the user device. The server preferably sends the content to be displayed to the native application on the user device. The server can additionally indicate the order in which to display the content. The server can additionally send display instructions with the content. Alternatively, the user device can determine the order in which to display the content. The server preferably sends the user device an ordered list of references (e.g. URLs) to the content, but can alternatively send the content itself. Alternatively, the server can send the user device an ordered list of references to a content parameter, such as a list of references to the connections that authored the content. The server preferably sends a single list, but can alternatively send multiple lists, each with different content order or display instructions (e.g. content to be displayed as a map has different rankings than content to be displayed as a list). The server can additionally generate and send the native application or user device any content representations (e.g. icons) or pointers (e.g. URLs) to the content representations that should be used. Alternatively, the content can be both processed and displayed by the user device.

Preferably, the most relevant content is selected for preferential presentation to the user. In one variation, all content can be displayed to the user, wherein the content can be loaded and displayed in batches (e.g. display the first 10 most relevant pieces of content, then the next 10 most relevant pieces of content, etc.). In another variation, content having relevance scores beyond a predetermined threshold are displayed to the user. However, any suitable amount of location-associated content can be selected for display to the user.

Figure 3A:
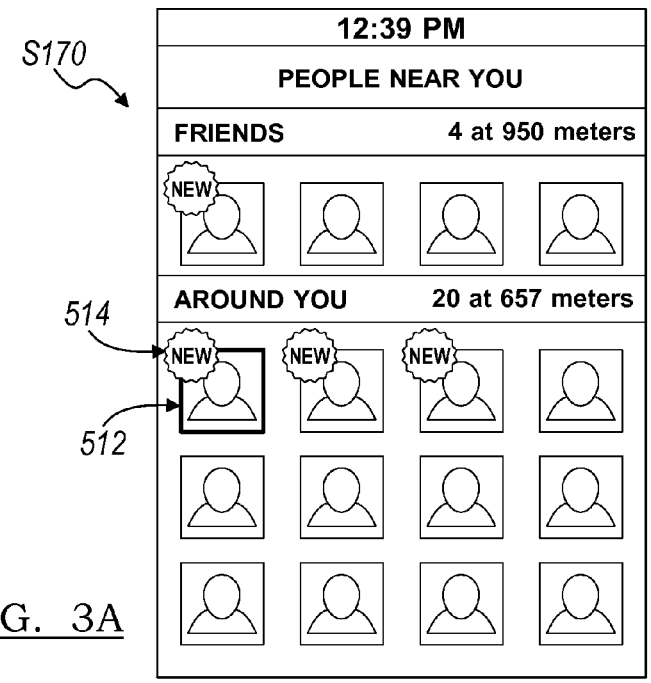
FIGS. 3A and 3B are exemplary representations of presenting relevant content.

The relevant content is preferably organized into a graphical representation of the content. In one variation of the method, the content is directly displayed. In this variation, the content is preferably organized into a feed, as shown in FIG. 3A. The feed preferably includes a list of relevant content, preferably ordered by relevance (e.g. with the most relevant at the top of the list). In one alternative, the feed is ordered first by distance away from the user location, then by relevance. In another alternative, the feed is ordered first by proximity between the content time and request time, then by relevance. In another alternative, the feed is ordered by proximity between the content location and user location, then by relevance. The feed preferably additionally includes an identifier for the associated content author, such as a name and/or picture, and can additionally include the distance away from the user location, the time of content generation, or any other indicator of any other suitable parameter of the content.

In another variation of the method, the content is preferably represented by an icon, wherein selection of the icon reveals the associated content (e.g. on a separate page or as a popup). The icon is preferably indicative of the associated content, and unique to the associated content. The icon preferably includes an image associated with the content, but can alternatively include a screenshot, a video, an audio clip, or any other suitable media associated with the content. In one alternative of the variation, the icon can include an image associated with the connection associated with the content (e.g. an image associated with the content author), wherein the image is preferably pulled from a connection account associated with the connection (e.g. from the social network that the content was generated on).

Alternatively or additionally, the icon can include a non-unique icon representative of the number of pieces of content in said area. In one variation of the method, the non-unique icon includes a number representative of the number of pieces of content in the given area. For example, if multiple pieces of content are generated in close geographical proximity, multiple pieces of content can be grouped together and represented as a single icon with a number representing the respective number of pieces of content. Upon receipt of a user selection of the number icon, the user device can display icons more representative of the individual pieces of content (e.g. images of the content authors), display the multiple pieces of content, preferably in order of relevance, or perform any other suitable action. Content is preferably displayed as a non-unique icon when the number of icons in the display area reaches a density threshold.

Figure 3B:
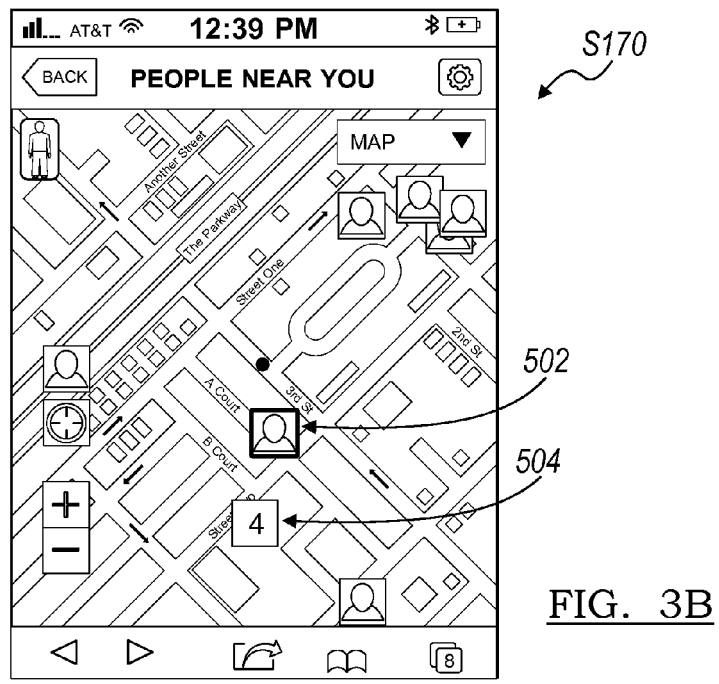

Additionally or alternatively, as shown in FIG. 3B, content deemed highly relevant (e.g. has a relevance score above a given threshold) can be displayed as an icon 502 uniquely associated with the content (e.g. an image of the content author), whereas content deemed less relevant can either be displayed as a unique icon or be grouped together with other pieces of content into a non-unique icon 504 when a density condition is met.

Additionally or alternatively, the icon can include a symbol representative of the social network in which the content was generated. Alternatively, when the content includes an image or video, the icon can be the image or a frame of the video. However, any suitable icon indicative of the content or content author can be used.

In this variation, the content is preferably organized into a map, as shown in FIG. 3B, wherein the icons representing the content are preferably arranged according to proximity to the user. Alternatively, the icons representing the content can be arranged in a grid, wherein the icons are preferably arranged in order of relevance, with the icons representing the most relevant content at the top. For example, images of the authors of the location-associated content can be displayed as a grid of images. Alternatively, the icons can be arranged in any suitable manner.

However, the content can be represented in any suitable form, and organized in any suitable organization.

As shown in FIGS. 3A and 3B, the graphical representation of the content can additionally include relevance indicators 510, which can function to indicate the degree of relevance to the user or the type of relevance of the content. The relevance indicator can include a relevance degree indicator 512, wherein the graphical representation preferably includes at least two relevance indicators: a first relevance indicator indicative of content having a relevance score over a predetermined threshold, and a second relevance indicator indicative of content having a relevance score under the threshold. Relevance degree indicators can include variations in the color, size, shape, font, or any other suitable aspect of the content representation. For example, content having a relevance score above a predetermined threshold can be larger and/or bordered in red, whereas content having a relevance score below a second predetermined threshold can be smaller and/or bordered in blue. The relevance degree indicator can also be different types of content representation, such as the unique and non-unique icons as described above. Additionally or alternatively, relevance indicators 510 can include relevance type indicators 514, and include one or more symbols (e.g. a star, exclamation point, etc.) overlaid or incorporated into the content representation, representative of the reason why the content is deemed relevant. Relevance type indicators can include a contact symbol, which can indicate that the content was authored by a social network contact (e.g. include a symbol or color representative of the social network); an interest symbol, which can indicate that the content can be of interest to the user; a nearby symbol, which can indicate that the content was recently posted in the very near vicinity of the user (e.g., within 25 meters), or any other suitable indicator of why the user should be interested in the content.

Additionally or alternatively, the method can include generating an alert of content satisfying an alert condition. In this variation, the location-associated content is periodically or continuously updated. Alternatively, a subset of content is continuously updated, such as content posted by the social network connections of the user. The content can additionally be updated based on changes in the user location.

The alert is preferably triggered when the retrieved content meets an alert condition, and the user is notified of the new content. The alert can be triggered when a contact of the user generates content within a set distance from the user location. In this way, a user will be notified when a contact is around them. This alert can additionally occur when a popular user or a similar user posts content. A user can preferably set the alerts for particular users. Additionally, users can establish a type of social network relationship or agreement to have alerts generated when they come within a set distance from each other. These alerts can be generated based on updates of a user and/or be generated automatically based on location of a user. For example, two users can agree to be notified when the two users are within a set distance from each other. The two users can be alerted whenever the two users come within the set distance. The alert can alternatively be triggered when a rarity condition is met. The rarity condition is preferably satisfied when the combination of content parameters has a historical occurrence rate of below a rarity threshold. In one variation of the method, the rarity threshold includes a location rarity threshold, wherein an alert is displayed to the user when the content is generated in a location by a connection that historically generates content in a disparate location (e.g. a different politically or culturally defined location, a location outside of a predetermined radius, etc.). However, any suitable rarity condition can be used. Alternatively, the alert can be triggered when the content meets a display setting. Alternatively, the alert can be triggered by the satisfaction of any other suitable alert condition.

The alerts are preferably pop-up notifications, such that the user does not have to be actively using the native application to be alerted. However, the alerts can be notifications within the application. The alerts preferably include a text notification, but can additionally or alternatively include audio, video, an image, tactile alerts (e.g. vibration) or any other suitable notification. Furthermore, the types of alert mediums employed by each alert can be dependent on the degree of relevance of the alerted content.

Figure 4:
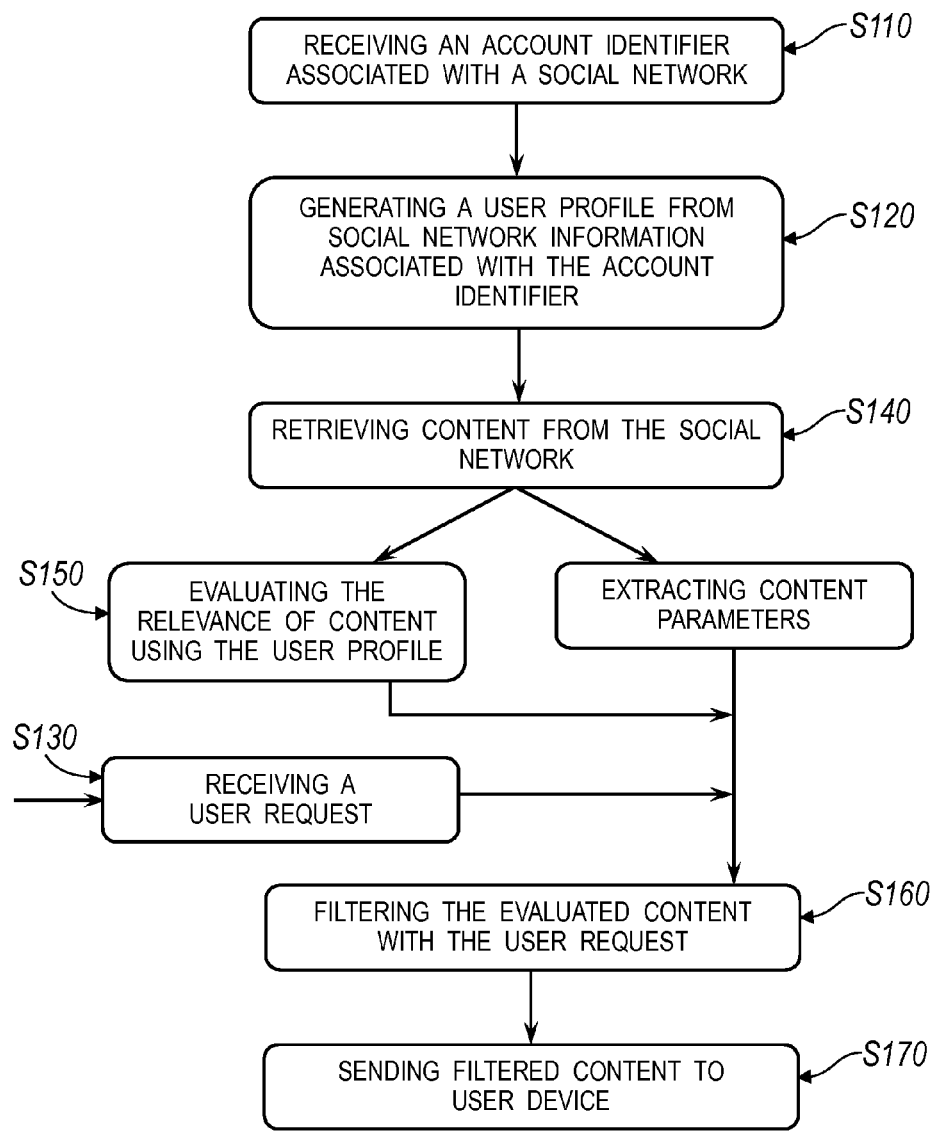
FIGS. 4-6 are schematic representations of a first, second, and third variation of the method, respectively.

In one variation, as shown in FIG. 4, the method includes: receiving an account identifier associated with a social network from a user device S110; generating a user profile from social network information associated with the account identifier S120; retrieving content from the social network associated with the account identifier S130; extracting content location, content time, and content connections (e.g. the content author) from the retrieved content; evaluating relevance of the retrieved content S150; in response to receipt of a user request including a device location and request time S130, filtering the evaluated content with the device location and request time S160; and sending the user device the filtered content as a list sorted by relevance. The user device then preferably displays the content as a list sorted by relevance. Alternatively, the user device retrieves connection account images from the social network based on the references (e.g. URLs) received from the server, and displays the account images as icons overlaid on a map, wherein the icons are located substantially near their respective content locations on the map. The user device can additionally display the icons with relevance indicators (e.g. social network indicators, stars for highly relevant connections or content, different colors or shapes referencing different levels of relevance, etc.). The content is preferably evaluated for relevance based on the degree of similarity between the user profile and the content parameters, wherein the content parameters include the body of the content and the social network connection associated with the content. For example, content can be evaluated based on the body of the content, degree of connection between the content connection and the account identifier, and/or the degree of shared interests between the user profile and the content connection. Filtering the evaluated content with the device location and request time preferably includes selecting content having a content location encompassed by a location region derived from the device location and a content time encompassed by a time period extending backwards from the request time.

Figure 5:
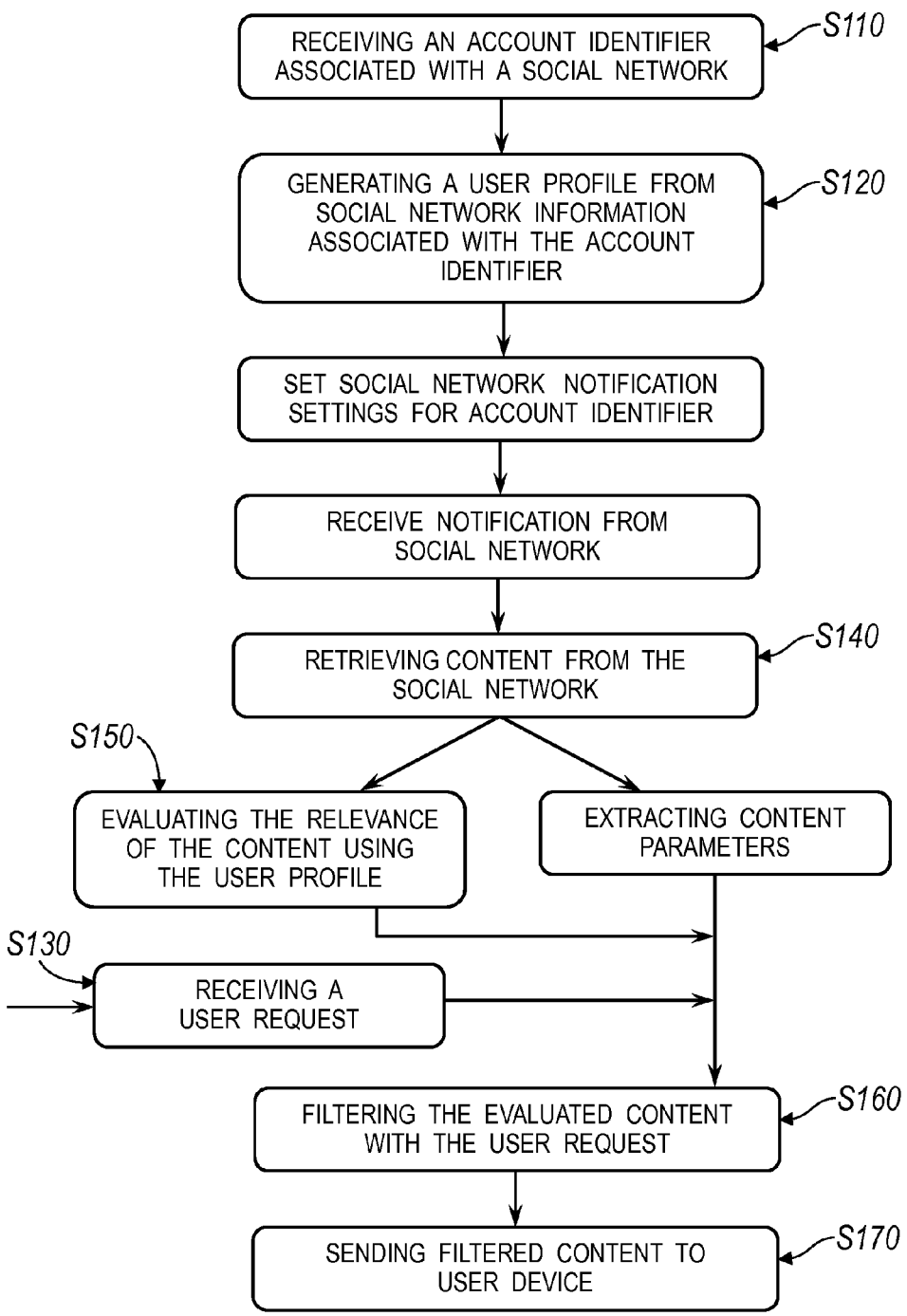

In another variation, as shown in FIG. 5, the method includes: receiving an account identifier associated with a social network S110; generating a user profile from social network information associated with the account identifier S120; setting notifications settings for the account identifier through a social network API, the setting notifications including a time setting, such that the server is notified of content newly generated by the social network connections of the account; in response to receiving a social network notification, retrieving the notified content from the social network S140; extracting the content location, content time, and content connections (e.g. the content author) from the retrieved content; evaluating relevance of the retrieved content S150; in response to receipt of a user request including a device location and request time S130, filtering the evaluated content with the device location and request time S160; and displaying the filtered content according to the respective evaluated relevance of the content S170. Alternatively, a content parameter, such as the connection that generated the content or a representation thereof (e.g. an image), can be displayed. The method can additionally include sending the filtered content as an ordered list to the user device.

In another variation, the method includes: receiving an account identifier associated with a social network S110; generating a user profile from social network information associated with the account identifier S120; receiving a user request including a device location and a request time S130; retrieving content from the social network, the retrieved content associated with a location region derived from the device location and generated within a predetermined time period derived from the request time (e.g. by using an API of the social network) S140; evaluating relevance of the location-associated content according to similarity with the user profile S150; and displaying the location-associated content on the user device according to the respective content evaluation S170. Alternatively, a content parameter, such as the connection that generated the content or a representation thereof (e.g. an image), can be displayed in lieu of the content itself. The method can additionally include sending the filtered content as an ordered list to the user device.

In another variation, the method includes: receiving an account identifier associated with a social network from a user device S110; generating a user profile from social network information associated with the account identifier S120; determining a plurality of locations of interest from the social network information associated with the account identifier; retrieving content from the social network, the retrieved content associated with at least one of the plurality of locations S140; evaluating relevance of the location-associated content according to similarity with the user profile S150; and sending the evaluated, location-associated content to the user device.

Figure 6:
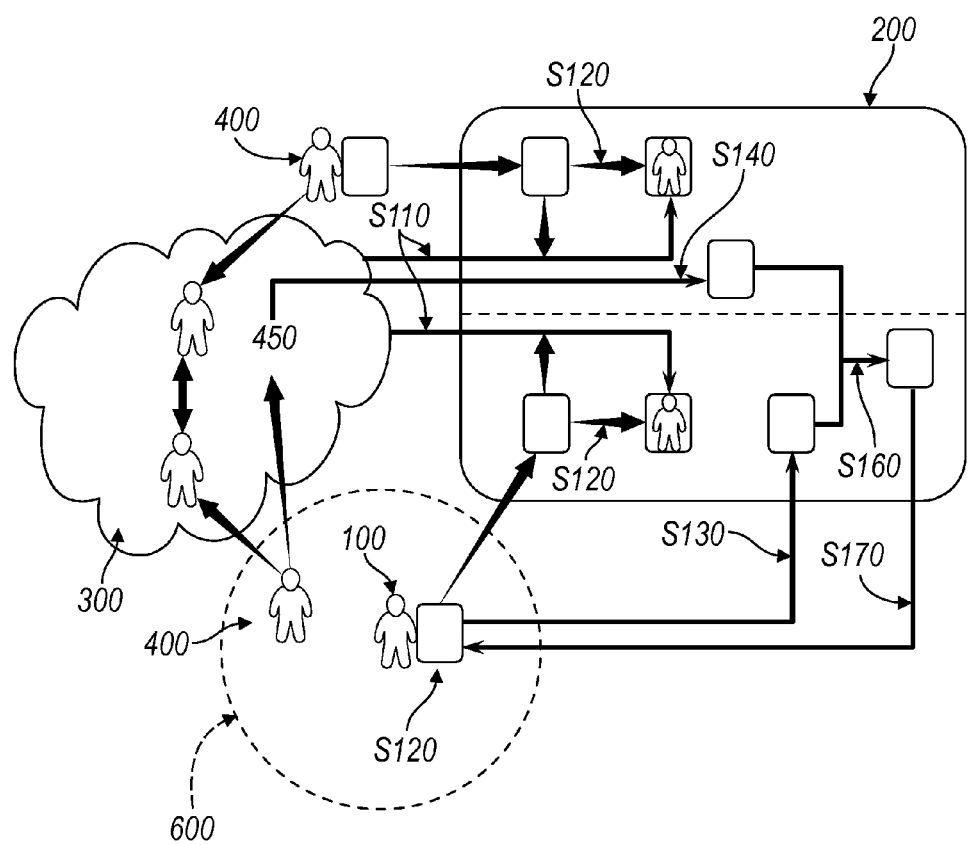

In another variation, as shown in FIG. 6, the method includes: receiving a first and a second account identifier from a first and second device S110; generating a first and second user profile from social network information associated with the first and second account identifiers, respectively S120; retrieving a first and second set of social network connections associated with the first and second account identifiers, respectively; generating connection profiles for each of the first and second social network connection sets from public information associated with each social network connection; receiving a content set associated with the second account identifier S140; extracting content location and content time from the received content; in response receipt of a device location and a receipt time from the first device S130, selecting content from the second content set that satisfies a location condition and a time condition of the first profile S160; and sending the selected content to the first device S170. Additionally, the selected content can be evaluated prior to sending to the device. This variation can permit users to discover previously unknown users or content generated by said unknown users.

Aspects of the system and method of the preferred embodiment can be embodied and/or implemented at least in part as a machine configured to receive a computer-readable medium storing computer-readable instructions. The instructions are preferably executed by computer-executable components preferably integrated with the user device, external server, and the various components thereof. Other systems and methods of the preferred embodiment can be embodied and/or implemented at least in part as a machine configured to receive a computer-readable medium storing computer-readable instructions. The instructions are preferably executed by computer-executable components preferably integrated by computer-executable components preferably integrated with a central computer or external server or user device of the type described above. The computer-readable medium can be stored on any suitable computer readable media such as RAMs, ROMs, flash memory, EEPROMs, optical devices (CD or DVD), hard drives, floppy drives, or any suitable device. The computer-executable component is preferably a processor but any suitable dedicated hardware device can (alternatively or additionally) execute the instructions.

As a person skilled in the art will recognize from the previous detailed description and from the figures and claims, modifications and changes can be made to the preferred variations of the invention without departing from the scope of this invention defined in the following claims.

We claim:

1. A method comprising:
   retrieving information, associated with an account identifier, from a social network;
   generating a user profile from the retrieved information, wherein the user profile comprises user interests;
   retrieving content from the social network;
   extracting content parameters from each piece of retrieved content, the content parameters comprising a content location and a content time;
   extracting an author from the retrieved content;
   evaluating a relevance of content by a degree of similarity between the user profile and the content;
   in response to receiving a device location and a filtering time:
     filtering the content by the device location and the filtering time;
     sending the filtered content to a user device; and
   displaying an alert, wherein the alert comprises filtered content satisfying an alert condition, wherein the alert condition comprises a rarity condition specifying that the alert is displayed to a user upon determining that a frequency of content generated by the author within a location region associated with the device location is below a rarity threshold and that content generated by the author is historically associated with a location outside of the location region.

2. The method of claim 1, wherein retrieving content comprises retrieving content from a plurality of social networks.

3. The method of claim 1, wherein the retrieved information comprises public information associated with the account identifier, wherein the user interests comprise interests extracted from the public information.

4. The method of claim 3, further comprising receiving access permissions associated with the account identifier, wherein the retrieved information further comprises private information associated with the account identifier, wherein user interests comprise interests extracted from the private information.

5. The method of claim 1, wherein retrieving content from the social network comprises retrieving content generated by social network connections of the account identifier.

6. The method of claim 5, wherein content associated with a plurality of locations is retrieved.

7. The method of claim 5, wherein retrieving content from the social network comprises retrieving content generated within a time threshold.

8. The method of claim 5, wherein retrieving content comprises retrieving content associated with the device location.

9. The method of claim 1, wherein the device location is periodically received.

10. The method of claim 1, further comprising: extracting connection accounts associated with the retrieved content; and generating connection profiles from information, received from the social network, associated with the connection accounts.

11. The method of claim 10, wherein evaluating relevance of the content further comprises evaluating relevance of the content according to a measured similarity between the user profile and the respective connection profile.

12. The method of claim 10, wherein evaluating relevance of the content further comprises evaluating relevance of the content by a degree of connection separation between the account identifier and the respective connection account.

13. The method of claim 1, wherein filtering the content comprises selecting the content according to proximity between the content location and the device location.

14. The method of claim 13, wherein the extracted content location is a geotagged location of the content.

15. The method of claim 1, wherein filtering the content comprises selecting the content according to proximity between the content time and the filtering time.

16. The method of claim 15, wherein the content time is the time of content posting to the respective social network.

17. The method of claim 1, wherein sending the filtered content to a user device comprises sending the filtered content as a list comprising: identifiers representative of the filtered content; and display instructions associated with the identifiers.

18. The method of claim 1, further comprising displaying, at the user device, the filtered content as a representation of the filtered content, wherein the representation comprises an icon associated with the respective content.

19. The method of claim 18, further comprising: extracting connection accounts associated with the content; and referencing an image associated with each connection account, wherein the icon comprises the referenced image.

20. The method of claim 19, wherein the filtered content is displayed on a map.

21. The method of claim 18, further comprising displaying the filtered content with a first and second relevance indicator, wherein displaying filtered content with a first and second relevance indicator comprises:
   displaying content having a score derived from the evaluated relevance over a predetermined threshold with the first relevance indicator; and
   displaying content having rank under the predetermined threshold with the second relevance indicator.

22. The method of claim 21, wherein the first relevance indicator comprises a unique icon representative of the respective content, and the second relevance indicator comprises a non-unique icon.

* * * * *